United States Patent [19]
Giorgini et al.

[11] 3,938,826
[45] Feb. 17, 1976

[54] ASPIRATED VEHICLE OCCUPANT RESTRAINT SYSTEM

[75] Inventors: Gerardo Giorgini, Moncalieri, Turin; Giorgio Bocca, Chivasso, both of Italy

[73] Assignee: Eaton Corporation, Cleveland, Ohio

[22] Filed: Feb. 7, 1974

[21] Appl. No.: 440,604

[52] U.S. Cl. .................................. 280/150 AB
[51] Int. Cl.$^2$ .................................. B60R 21/08
[58] Field of Search .......................... 280/150 AB

[56] References Cited
UNITED STATES PATENTS

| | | | |
|---|---|---|---|
| 3,624,810 | 11/1971 | Hass | 280/87 R X |
| 3,758,133 | 9/1973 | Okada | 280/150 AB |
| 3,762,741 | 10/1973 | Fleck et al. | 280/150 AB |
| 3,767,225 | 10/1973 | Mazelsky | 280/150 AB |
| 3,773,350 | 11/1973 | Shibamoto | 280/150 AB |
| 3,773,351 | 11/1973 | Catanzarite | 280/150 AB |
| 3,791,666 | 2/1974 | Shibamoto | 280/150 AB |
| 3,801,127 | 4/1974 | Katter | 280/150 AB |
| 3,840,246 | 10/1974 | McCullough | 280/150 AB |

Primary Examiner—M. Henson Wood, Jr.
Assistant Examiner—John P. Silverstrim
Attorney, Agent, or Firm—Teagno & Toddy

[57] ABSTRACT

An improved aspirated, inflatable vehicle occupant restraint system is provided of the type including a housing, a confinement, means for expanding the confinement from a collapsed condition to an expanded condition and aspirator means having an inlet in fluid communication with the confinement. At least one flap is attached to the inner surface of the confinement, each flap being positioned to i. normally close the inlet of the aspirator means when the confinement is in the collapsed condition, and ii. gradually expose the inlet of the aspirator means when the expanding means is activated and the confinement moves from the collapsed condition to the expanded condition.

14 Claims, 6 Drawing Figures

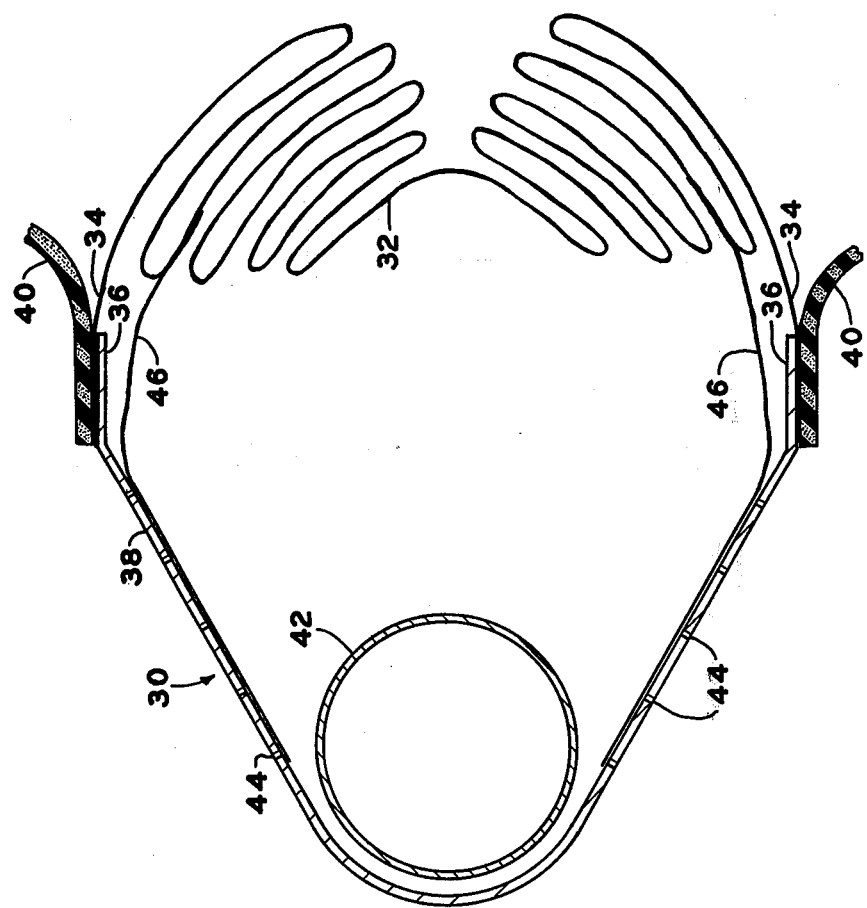

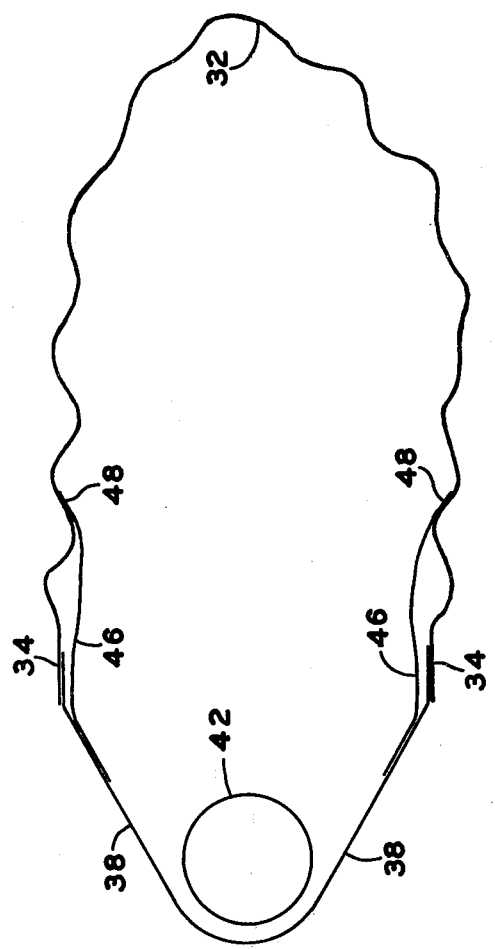

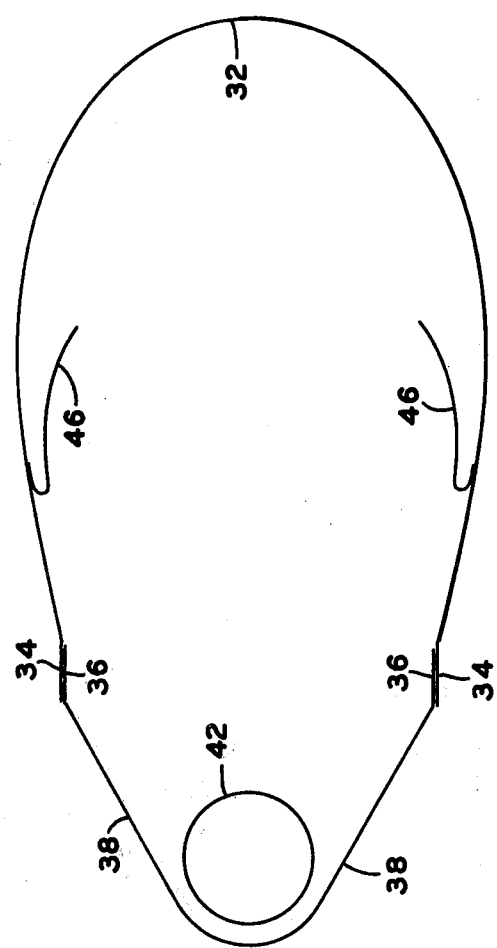

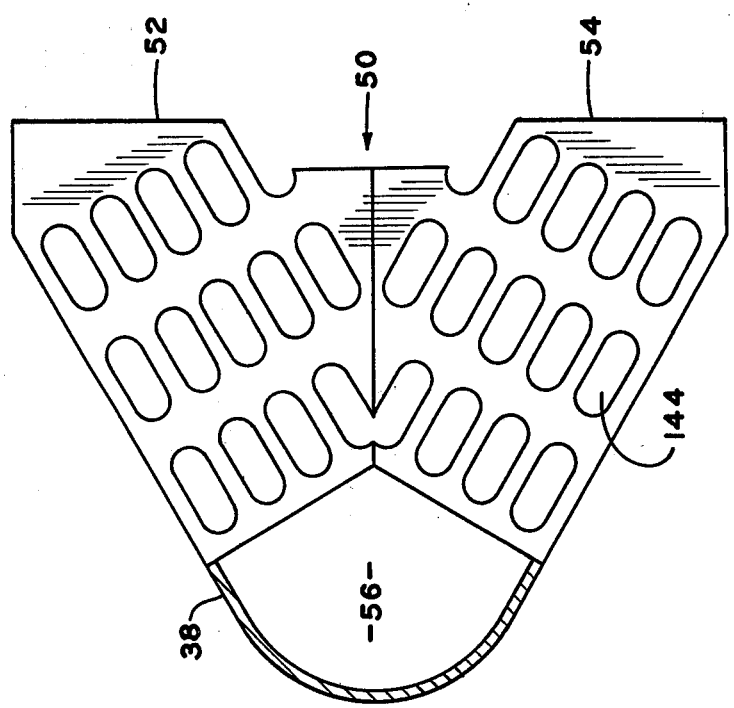

ASPIRATED VEHICLE OCCUPANT RESTRAINT SYSTEM

BACKGROUND OF THE DISCLOSURE

The present invention relates to a vehicle safety apparatus for restraining an occupant of a vehicle during a collision, and more particularly, to such an apparatus having an inflatable confinement which aspirates during inflation.

Vehicle safety devices for protecting the occupant of a vehicle by restraining his forward motion, relative to the vehicle, during a collision have become well known. Such systems include a confinement which is inflated by a flow of fluid from a reservoir to expand the confinement in time to cushion the forward movement of the occupant, absorbing his kinetic energy, and thereby preventing injury. Various problems have arisen in the development of such systems, however. The desired expansion of the confinement requires a relatively large amount of fluid, which in turn requires a fairly large, heavy fluid reservoir. In addition, if the inflator system employs pyrotechnics, i.e., the ignition or burning of a propellant fuel to facilitate the expansion of the inflation gas, there is the added problem of the heat of the inflation gas and the possible presence of toxic fumes.

It is also necessary to be able to quickly deflate the confinement, either when the confinement may engage an obstruction, such as an occupant in an unusual seating position, or immediately after the collision when it may be desirable for the occupant to exit the vehicle quickly. In the conventional inflatable restraint systems, various devices have been employed to deflate the confinement. Typical of these are the blow-out patches illustrated in U.S. Pat. No. 3,560,018. In operation, when the confinement is deployed and the pressure within the confinement exceeds a predetermined value, the patch is blown loose from the confinement, exposing an aperture therein through which the inflation gas may be exhausted. Such exhaust means are useful, but merely add to the manufacturing expense of the system and are thus undesirable.

An additional requirement which has been imposed both by the trend toward smaller cars and the desire to be able to locate the devices on the steering wheel, is an increase in the speed of inflation. Inflation of the confinement may be restricted in smaller cars because as the confinement expands, the volume of air in the passenger compartment must be either compressed or forced from the compartment.

The above and other problems encountered in the vehicle safety art have been partially solved by the development of the aspirated vehicle occupant restraint system, by which it is meant that air from outside the system is drawn into the confinement during the expansion thereof. Aspirated systems of the type illustrated in U.S. Pat. No. 3,632,133 utilize an arrangement of concentric nozzles, through one of which a stream of the inflation gas is passed into the confinement, and through the other, a larger volume of air is drawn into the confinement from outside the system, such as from under the dashboard, thus maintaining the atmospheric pressure within the passenger compartment during expansion of the confinement. In such prior art aspirated systems, the interior of the confinement is in permanent, open communication with the atmosphere outside the system and there is no possibility of control over the amount or rate of aspiration. Nor is it feasible, with a concentric-nozzle aspiration system, to utilize an elongated diffuser to distribute the inflation gas uniformly across the entire width of the confinement. Another problem which has arisen in the use of both the aspirated and conventional air bag systems is the possibility of injury to a passenger, in certain circumstances, for example, a child standing in front of the seat adjacent the dashboard. Such injury may result when the child is too close to the confinement as it begins to deploy. Therefore, it has been desirable to provide adequate exhaust or "blow-off" means for such situations.

SUMMARY OF THE INVENTION

Accordingly, it is an object of the present invention to provide an improved aspirated, inflatable vehicle occupant restraint system which is of a simple, inexpensive construction and is compact enough to be used in smaller cars or to be mounted on the steering wheel.

It is another object of the present invention to provide an aspirated vehicle safety device which is capable of being aspirated at a progressively increasing rate as the confinement expands.

It is a related object of the present invention to provide such a device which is aspirated in a manner that minimizes the time required to inflate the confinement, but which subsequently permits quick and automatic deflation without the need for special exhaust valves or blow-out patches.

It is also an object of the present invention to provide an aspirated, inflatable vehicle occupant restraint system which does not require, for its operation, that the inflation gas enter the confinement as a continuous, integral stream of fluid.

These and other objects of the present invention, which will become apparent upon a reading of the following detailed description, are accomplished by the provision of an improvement in an aspirated vehicle occupant restraint system of the type including a housing, a confinement having a collapsed condition in which it is located in the housing, and an expanded condition for restricting the movement of an occupant in the passenger compartment of the vehicle, means for expanding the confinement from the collapsed condition to the expanded condition and aspirator means having an inlet in fluid communication with the confinement. The improvement comprises:

at least one flap attached to the inner surface of the confinement, with each flap positioned to
  i. normally close the inlet of the aspirator means when the confinement is in a collapsed condition, and
  ii. progressively expose the inlet of the aspirator means when the expanding means is activated in a confinement moves from the collapsed condition to the expanded condition, moving the flap.

In accordance with another aspect of the present invention, the aspirator means and the inlet thereof comprise the housing defining a plurality of perforations, and a plurality of flaps are provided which are positioned, when the confinement is in the collapsed condition, to cover substantially the entire area of the housing defining said perforations.

BRIEF DESCRIPTION OF THE DRAWINGS

FIG. 3 is a cross section similar to FIG. 2, with the confinement beginning to open.

FIG. 4 is a cross section, similar to FIG. 3, showing the confinement partially opened.

FIG. 5 is a cross section, similar to FIG. 4, with the confinement in the expanded condition.

FIG. 6 is an end view of the housing of the present invention.

DESCRIPTION OF THE PREFERRED EMBODIMENTS

Figure 1:
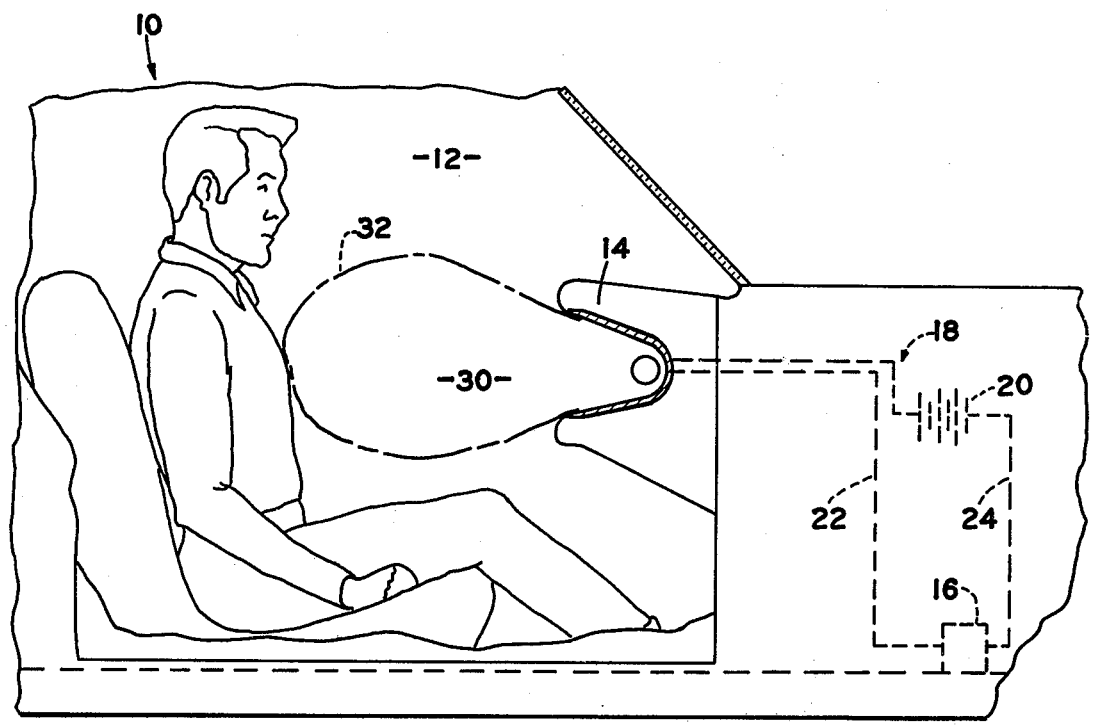
FIG. 1 is a schematic illustration of a vehicle wherein there is mounted a safety device constructed in accor

Referring now to the drawings, which are for the purpose of illustrating preferred embodiments of the present invention, and not for limiting the same, FIG. 1 illustrates schematically the operation of the present invention in a vehicle 10. Although the inflatable occupant restraint system constructed in accordance with the present invention can be used to protect the occupant of many types of vehicles, such as trucks, tractors, boats, and airplanes, the present system is especially useful in an automotive vehicle 10 and will be described in connection therewith. The restraint system generally designated as 30, can be mounted in many different locations, in a passenger compartment 12 of the vehicle 10. In the subject embodiment, the apparatus 30 is mounted within the dashboard 14, and includes an inflatable confinement 32 expandable from a collapsed non-operative condition to an expanded operative condition in which it restrains the vehicle occupant as shown in FIG. 1.

A sensor assembly 16 of the type well known in the art is provided for detecting the occurrence of a collision and activating the restraint system by means of electrical circuitry 18 which includes a battery 20 and a pair of leads 22, 24.

Figure 2:
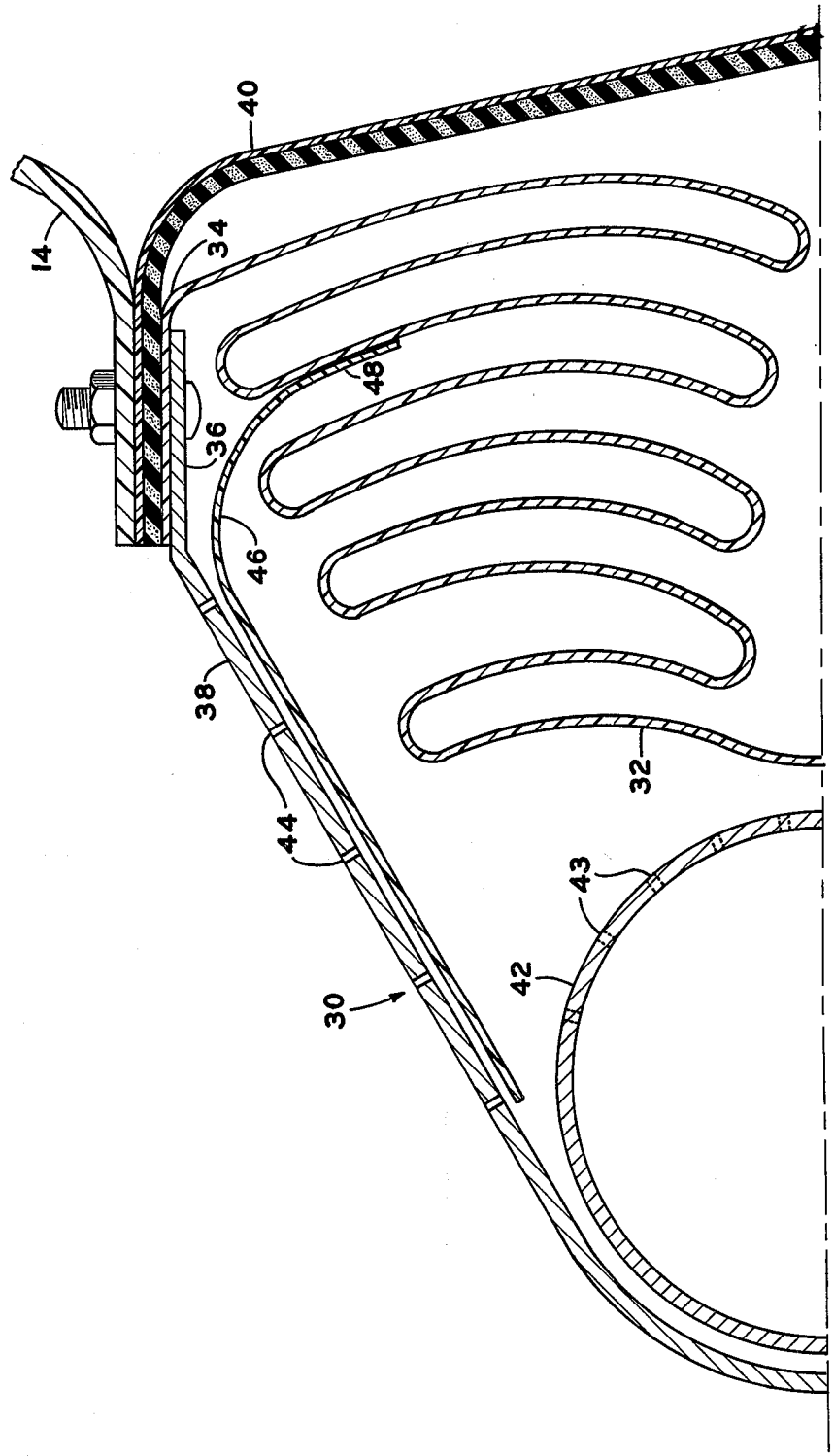
- FIG. 2 is an enlarged half-section of the device in a collapsed condition.

FIG. 2 illustrates the structural details of the safety apparatus 30. The inflatable confinement 32 is in its normal, collapsed condition, wherein the confinement 32 is folded and stored within the apparatus 30. It should be clearly understood that the manner in which the confinement 32 is arranged and folded in FIG. 2 is for illustration purposes only and the confinement 32, within the scope of the present invention, may be folded and stored in any manner consistant with the purpose of the invention. It is preferred that the confinement 32 be made of a flexible material which is fluid tight, such as woven nylon coated with a fluid impervious coating. However, it will be understood that other suitable materials may be utilized, including uncoated fabric of sufficiently tight weave.

The confinement 32 is attached along its peripheral edge 34, between a flange 36 projecting from the housing member 38, and a cover 40. It should be noted that FIG. 2 is semi-schematic, and the details of the actual attaching arrangement for the peripheral edge 34 of the confinement 32, form no part of the present invention.

Within the generally V-shaped housing 38 is a diffuser 42 having apertures 43 through which the inflation gas flows to inflate the confinement 32. The diffuser 42 merely represents the inflation system and indicates that the inflation system may be of the concentric type in which the gas generating means is positioned within an elongated, cylindrical diffuser or the inflation system may be of the end-fed type in which the gas generating means is located external to the diffuser and the gas is fed into the diffuser from one end. While the inflation system may within the scope of the present invention be of any configuration, it is preferred to use an elongated cylindrical diffuser of either the concentric or end-fed arrangement, as opposed to one or more individual streams of inflation fluid coming from the gas generating means directly into the housing. This is partly because the safety system 30, and therefore the housing 38, may be required to extend over a portion of the width of the passenger compartment, generally 1 foot or more in length.

As illustrated in FIG. 2, the wall of the housing 38 defines a plurality of passages or perforations 44. A flap 46 is attached by its end portion 48 to the inner surface of the wall of confinement 32, at a point intermediate the peripheral edge 34 and the oppositely disposed terminal portion. When the confinement 32 is in the collapsed condition of FIG. 2, the flap 46 is positioned along the inner surface of the wall of the housing 38, covering the perforations 44. The flap 46 may be maintained in this position by means of a slight positive pressure within the housing 38, or more preferably, merely by making the housing 38 small enough that the confinement 38, in its collapsed condition, completely fills the housing 38, holding the flap 46 against the wall. The flap 46 may be made from a material similar to that of the confinement 32 and may have its end portion 48 permanently joined to the inner surface of the confinement by any workable means such as stitching or a suitable adhesive.

FIG. 6, an end view of the housing 38, shows the preferred end wall configuration of the subject embodiment. The end wall, generally designated by the number 50, comprises a down-turned upper flange 52 and an up-turned lower flange 54, both of which define a plurality of perforations 144. It should be noted that although the perforations 44, as shown in FIGS. 2 and 3, were relatively small, it may be more desirable to employ larger ones such as the end wall perforations 144 of FIG. 6 in order to provide a sufficiently large exhaust or blow-off area through the housing 38 such that there is no need for additional blow-off valves or patches in the confinement. The end wall 50 also defines an aperture 56 which provides for entry into the housing of a feed duct (not shown) to the end of the diffuser (omitted in FIG. 6) as is required in an "end-fed" inflation system. As mentioned above, the housing 38 preferably has a generally V-shaped configuration with flat end walls, and the confinement 32 preferably has generally flat end panels (not shown) attached at end wall 50 in much the same manner as the confinement 32 is attached to the housing flange 36. Attached to the inside of each of these end panels may be an end flap which covers the perforations 144 in the same general manner as flaps 46 cover perforations 44. Such end flaps operate as explained for flaps 46 but, depending on the configuration of the confinement, the end flaps may require a longer period of time to uncover their respective perforations than do the flaps 46.

OPERATION

FIGS. 2 through 5 illustrate the successive stages in the inflation of the confinement 32. When the sensor 16 detects the occurrence of a collision, the gas generating means is activated, and the inflation gas passes through the openings in the diffuser 42, exerting pressure against the confinement 32. This pressure, in turn, forces open the cover 40, preferably by causing it to separate or rupture along a portion which may be slightly perforated, or thinner or in some other way weakened ralative to the remainder of the cover 40, as is well known in the art. After the cover 40 has been forced open, as is shown in FIG. 3, the confinement 32 is then forced out of the housing 38 and begins deployment. At the stage of deployment shown in FIG. 3, the flap 46 still covers substantially all of the perforations 44 in the walls of the housing 38. Therefore, at this point in time, the confinement 32 is being inflated solely by the inflation gas passing from the diffuser 42. The flaps 46 continue to cover the holes 44 as shown in FIG. 3 because the portion of the confinement 32 to which the end portion 48 of the flap 46 is attached has not yet moved very far from its normal storage position. In addition, the flaps 46 are maintained against the wall of housing 38 by the pressure exerted by the inflation gas.

In FIG. 4, the confinement 32 has been inflated to about one-half of the volume it will occupy in its fully expanded condition. In reaching this stage of deployment, the confinement has pulled the flaps 46 a sufficient distance out of the housing 38 to expose some of the perforations 44 which are furthest from the flange 36. When some of the perforations have been uncovered, the inflation of the confinement 32 no longer occurs solely by means of the inflation gas, but includes passenger compartment air drawn therein by aspiration through the perforations 44.

As mentioned previously, some occupant restraint systems utilize a burning propellant to facilitate the expansion of the inflation gas. Where this type of inflation is used, the flap arrangement of the present invention provides a system which initially prevents the inflation gas from being in fluid communication with the vehicle passenger compartment. As the confinement is inflated, however, aspiration occurs as the perforations are progressively uncovered and atmospheric air is drawn into the confinement to cool the inflation gas, and to dilute any toxic propellant combustion products that may be present.

Referring to FIG. 5, illustrating the confinement 32 in its fully expanded condition, the flaps 46 have now been pulled completely out of the housing 38, thereby exposing all of the perforations 44. As this occurs, the influx of inflation gas and atmospheric air tends to force the flaps 46 into the positions shown in FIG. 5, until the pressure within the confinement and the housing stabilizes.

It should be clearly understood that although air is aspirated in the subject embodiment through perforations 44 in the housing 38, it is contemplated that other aspirator means may be used. It is necessary only that there be an aspirator or air inlet means provided which has an inlet in fluid communication with the interior of the confinement, and that at least one flap be attached to the inner surface of the confinement and positioned in such a way that it normally closes the inlet of the aspirator means when the confinement is in the collapsed condition, and gradually exposes the inlet of the aspirator means when the expanding means is activated and the confinement is inflated, the flap being moved in response to deployment of the wall of the confinement. Alternatively, means other than the flaps 46 may be provided for normally closing the air inlet when the confinement is in the collapsed condition, as long as the closing means are capable of gradually exposing the air inlet in response to the deployment and expansion of the confinement. It is also a feature of the present invention that the closing means permits the inflation gas to be exhausted through the air inlet when the confinement is subjected to sufficient external pressure, as when the confinement engages an obstruction such as a child standing in front of the seat or is impacted by the occupant. Under these conditions, the inflation gas may be exhausted through the end wall perforations 144 as well as the perforations 44. Therefore, aspirator means such as the perforations 44 in the subject embodiment is preferred because the amount of aspirated air entering the confinement is thereby progressively increased.

During a collision, the confinement becomes fully inflated as in FIGS. 1 and 5, generally before the occupant begins to move forward with respect to the passenger compartment. Therefore, it is desirable as the occupant is thrown forward against the inflated confinement that the confinement not provide a rigid, immovable obstacle to the occupant, but rather a resilient cushion, which is capable of some deflation as soon as the occupant engages the confinement, in order to minimize the "rebound" of the occupant. It is a feature of the present invention that the desired deflation can occur quickly and automatically through the aspirator means, the perforations 44. It is another important feature of the invention, in view of the possible presence of toxic propellant combustion products in the inflation gas, that the fluid contained within the confinement is exhausted through the housing 38 behind the dashboard 14, rather than directly into the passenger compartment 12. It will be apparent to those skilled in the art that the selection of the number and size of the perforations 44 will affect the deflation characteristics of the confinement as it is engaged by the occupant.

The invention has been described in great detail, sufficient to enable one of ordinary skill in the art to make and use the same. Obviously, modifications and alterations of the preferred embodiments will occur to others upon a reading and understanding of the specification and such modifications and alterations are included as part of our invention insofar as they come within the scope of the appended claims.

We claim:

1. In an aspirated vehicle occupant restraint system including a housing, a confinement having a collapsed condition in which it is located in the housing and an expanded condition for restricting movement of an occupant in the passenger compartment of the vehicle, means for expanding the confinement from the collapsed condition to the expanded condition and aspirator means fixed in said housing having an inlet in fluid communication with the confinement, the improvement comprising:

flap means attached to the inner surface of the confinement wall intermediate the margins thereof, said flap means
  i. normally closing the inlet of the aspirator means when the confinement is in the collapsed condition, and
  ii. being progressively moved to expose the inlet of the aspirator means by movement of the confinement wall as the confinement moves from the collapsed condition to the expanded condition.

2. The system of claim 1 wherein the opening of the confinement is attached around the opening of the housing and the aspirator means includes a plurality of perforations formed in said housing.

3. The system of claim 2 wherein said flap means includes a plurality of flaps positioned, when the confinement is in the collapsed condition, to cover substantially the entire area of the housing defining said perforations.

4. The system of claim 2 wherein the housing is elongated and includes an upper member and a lower member, said members being disposed in converging-diverging arrangement and diverging in a direction toward the confinement.

5. The system of claim 4 wherein the expanding means includes an elongated diffuser positioned near the convergence of the upper member and the lower member, said diffuser having passage means for directing fluid flow therefrom into the confinement, such that air is drawn from outside the apparatus through said perforations in increasing amounts as the perforations are progressively exposed by the movement of said flap means.

6. The improvement of claim 4 wherein said aspirator means includes a pair of end walls formed in said housing means each defining a plurality of perforations, the improvement further comprising said flap means including a pair of end flaps each substantially covering one of said end walls when the confinement is in the collapsed condition.

7. A vehicle occupant restraint system comprising:
 a. housing means;
 b. a confinement attached to said housing means having a collapsed condition in which it is located in said housing means and an expanded condition for restricting movement of an occupant in the passenger compartment of the vehicle;
 c. means for expanding said confinement, with inflating fluid from the collapsed condition to the expanded condition;
 d. said housing means including means defining an air inlet in communication with the interior of said confinement; and
 e. means operable to normally close the air inlet when the confinement is in the collapsed condition, said inlet closing means including means attached to the wall of said confinement intermediate the margins thereof and being movable by movement of the confinement wall progressively exposing the air inlet, said closing means including means permitting the inflating fluid to be exhausted through the air inlet in the event the confinement contacts the occupant prior to full expansion.

8. The improvement of claim 7 wherein said means for progressively exposing the air inlet includes at least one flexible flap attached to the inner surface of the confinement wall.

9. The improvement of claim 7 wherein the confinement has a mounting portion attached to the housing and an oppositely disposed terminal portion, with said means normally closing the air inlet including means attached intermediate said mounting portion and said terminal portion.

10. A vehicle occupant restraint system comprising:
 a. a source of fluid pressure;
 b. means for activating said fluid source in response to the vehicle experiencing a collision;
 c. an inflatable confinement having a collapsed inoperative condition and an expanded operative condition; and
 d. means operable to direct fluid from said source into said confinement, said fluid directing means including valve means operable to permit fluid communication between the interior of said confinement and the atmosphere external thereto, said valve means including fluid port means and means slidably movable with respect to said port means, said slidably movable means being attached to the wall of said confinement and operable to prevent said fluid communication through said port means when said confinement is collapsed and operable by movement of said confinement wall to permit progressively increasing fluid communication through said port means between the atmosphere and said confinement.

11. The system defined in claim 10, wherein:
 a. said fluid directing means includes a housing having the periphery of said confinement attached thereto in a fluid pressure sealing manner;
 b. said valve means includes at least one aperture disposed in said housing; and
 c. said means attached to the wall of said confinement includes an elongated flexible member having one end thereof attached to the wall of said confinement, said member being disposed to block said apertures when said confinement is in the collapsed condition and movable upon expansion of said confinement to progressively uncover said apertures.

12. The system defined in claim 10 wherein said fluid directing means includes means for diffusing flow of fluid from said source to said confinement.

13. An assembly for an inflatable vehicle occupant restraint system of the type having a source of fluid pressure and means operable to activate said source upon occurrence of a collision, said assembly comprising:
 a. an inflatable confinement expandable from a collapsed non-operative position to an expanded operative position, said confinement having an aperture formed therein for introducing inflating fluid therein;
 b. means attached to the periphery of said confinement aperture, said means being operable to direct inflating fluid into said confinement upon connection to said fluid source, said fluid directing means including valve means operable to permit fluid communication between said confinement and the surrounding atmosphere, said valve means including fluid port means and means attached to the wall of said confinement intermediate the margins thereof and operable to prevent said fluid communication through said port means when said confinement is collapsed and operable by movement of the wall of said confinement to move transversely with respect to said port means to permit progressively increasing fluid communication through said port means between said confinement and the atmosphere.

14. The assembly defined in claim 13 wherein:
 a. said fluid directing means includes a housing having the periphery of said confinement attached thereto, said valve means including a plurality of apertures formed in said housing for communicating the interior of said confinement with the surrounding atmosphere; and
 b. said means attached to the wall of said confinement includes an elongated flexible member having one end thereof attached to the wall of said confinement, said member being disposed to block said apertures when said confinement is in the collapsed condition and movable upon expansion of said confinement to progressively uncover said apertures.

* * * * *